United States Patent
Patel

(10) Patent No.: US 10,430,067 B2
(45) Date of Patent: Oct. 1, 2019

(54) METHODS AND SYSTEMS FOR PRESENTING SCROLLABLE DISPLAYS

(71) Applicant: Rovi Guides, Inc., Santa Clara, CA (US)

(72) Inventor: Milan Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 287 days.

(21) Appl. No.: 14/574,915

(22) Filed: Dec. 18, 2014

(65) Prior Publication Data

US 2016/0179318 A1    Jun. 23, 2016

(51) Int. Cl.

| | |
|---|---|
| *G06F 3/0488* | (2013.01) |
| *G06F 3/0482* | (2013.01) |
| *G06F 3/0485* | (2013.01) |
| *H04N 5/445* | (2011.01) |
| *G06F 3/0484* | (2013.01) |
| *H04N 21/482* | (2011.01) |

(52) U.S. Cl.
CPC .......... *G06F 3/0488* (2013.01); *G06F 3/0484* (2013.01); *H04N 21/482* (2013.01); *H04N 5/44543* (2013.01)

(58) Field of Classification Search
None
See application file for complete search history.

(56) References Cited

U.S. PATENT DOCUMENTS

| | | | | |
|---|---|---|---|---|
| 5,327,160 A | * | 7/1994 | Asher | H03J 9/06 345/156 |
| 6,910,191 B2 | | 6/2005 | Segerberg et al. | |
| 7,376,913 B1 | * | 5/2008 | Fleck | G06F 3/0362 715/808 |
| 2003/0149984 A1 | | 8/2003 | Jacquelyn | |
| 2006/0164389 A1 | * | 7/2006 | Ringot | H03J 1/0016 345/157 |
| 2009/0019401 A1 | * | 1/2009 | Park | G06F 3/04883 715/841 |
| 2011/0016391 A1 | * | 1/2011 | Borovsky | G06F 3/04883 715/702 |
| 2013/0159922 A1 | * | 6/2013 | Borkowski | G06F 3/0485 715/786 |
| 2014/0282154 A1 | * | 9/2014 | Petit | G06F 3/0488 715/765 |

* cited by examiner

*Primary Examiner* — Nhat Huy T Nguyen
(74) *Attorney, Agent, or Firm* — Haley Guiliano LLP

(57) ABSTRACT

Methods and systems are discussed herein for navigating media content using scrollable displays. For example, scrollable displays may provide an efficient user interface in order to increase the amount and type of content that can be presented to a user, particularly with regard to small displays. For example, instead of transitioning to new displays, which may require larger display screens or the removal of already presented content, the methods and systems disclosed nest scrollable displays within each other in order to enable a user to efficiently access and navigate content options without large display screen requirements.

18 Claims, 5 Drawing Sheets

METHODS AND SYSTEMS FOR PRESENTING SCROLLABLE DISPLAYS

BACKGROUND

In conventional systems, consumers of media have a plethora of content options available. Consumers are also able to access content from smaller and more portable devices such as wearable electronics. However, the form factor of such devices constrains a size of a viewable display to the small size of the devices, which may limit the amount and type of content that may be displayed at one time.

SUMMARY

Accordingly, methods and systems are disclosed herein for navigating media content using scrollable displays. For example, scrollable displays may provide an efficient user interface in order to increase the amount and type of content that can be presented to a user, particularly with regard to small displays. For example, instead of transitioning to new displays, which may require larger display screens or the removal of already presented content, the methods and systems disclosed nest scrollable displays within each other in order to enable a user to efficiently access and navigate content options without large display screen requirements.

In some aspects, the methods and systems described herein may generate for display a first icon and a second icon, in which the first icon and the second icon are included in a first plurality of icons that are scrolled together in response to a first gesture. For example, a user device may generate for display a first icon indicating "Actor", and a second icon indicating "Movie." The methods and systems may receive a first selection of the first icon. For example, the user device may receive an input indicating a selection of the first icon, which indicates "Actor." The methods and systems may identify a second plurality of icons related to the first icon. For example, the user device may identify a plurality of icons representing specific actors, such as "Actor 1", "Actor 2", "Actor 3", "Actor 4", "Actor 5", and "Actor 6". The methods and systems may replace a display of the first icon with a display of a first portion of the second plurality of icons while the second icon continues to be displayed. For example, the user device may replace a display of the first icon indicating "Actor" with a display of a first portion of the second plurality of icons, such as "Actor 1", "Actor 2", "Actor 3", and "Actor 4". The methods and systems may scroll the second plurality of icons together to reveal a second portion of the second plurality of icons in replacement of the first portion of the second plurality of icons while the second icon continues to be displayed. For example, the user device may receive a swipe gesture, and in response to receiving the swipe gesture, scroll the second plurality of icons to replace an icon for "Actor 1" from a top of the first portion, with an icon for "Actor 4" at the bottom of the second portion.

In some embodiments, the second icon remains stationary as the second plurality of icons are scrolled. For example, the user device may scroll the second plurality of icons in response to receiving a second gesture. The second icon for "Movie" may not move during this scrolling process.

In some embodiments, a gesture includes a movement of one or more digits across a computer device. For example, a gesture may be a movement of one or two fingers downwards on a touch screen, to scroll either the first plurality of icons or the second plurality of icons.

In some embodiments, the first plurality of icons are no longer scrolled together after receiving the selection of the first icon. For example, after receiving the selection of the first icon, the user device may replace the display of the first icon with the first portion of the second plurality of icons. A portion of the first plurality of icons located above a displayed portion of the second plurality of icons may be scrolled while a portion of the first plurality of icons located below the displayed portion of the second plurality of icons may be restricted from scrolling.

In some embodiments, the first icon and second icon are generated for display on a first device in response to a user input on a second device. For example, the first user device may be a wearable display device such a Smart-Glass device. The second user device may be an input device, such as a touchpad that is separate from the first user device.

In some embodiments, the methods and systems adjust a size of each of the second plurality of icons related to the first icon when the second plurality of icons is scrolled. For example, in response to receiving a second gesture, the user device may reduce the size of each of the second plurality of icons such that a larger number of icons may be displayed during a scrolling operation.

In some embodiments, the methods and systems de-emphasize the second icon when the first icon is selected. For example, the user device may grey out, or reduce the size of the icon "Movie", when the icon for "Actor" is selected.

In some embodiments, the methods and systems may indicate that the second plurality of icons is scrollable. For example, the user device may generate for display a scrollbar next to the second plurality of icons. In some embodiments, a scrollbar may not be presented with the plurality of icons even though the plurality of icons is scrollable. In such circumstances, the plurality of icons may be presented in the form of a dial (as different segments on the outer perimeter of a cylindrical shape). As the user rotates the dial, other portions of the plurality of icons may be revealed.

In some embodiments, replacing the display of the first icon with the display of the first portion of the second plurality of icons while the second icon continues to be displayed includes nesting the first portion of the second plurality of icons in a cell previously occupied by the first icon. For example, the user device may remove the icon for "Actor" from a display including the icons "Genre", "Actor" and "Movie", arranged vertically. The user device may nest the first portion of the second plurality of icons (including "Actor 1", "Actor 2", "Actor 3", and "Actor 4") in place of a cell for the "Actor" icon that was removed from display.

In some embodiments, each of the second plurality of icons related to the first plurality of icons corresponds to a media guidance application operation. For example, the first icon may correspond to a TV Show 1, and the second icon may correspond to a TV Show 2. A selection of the first icon for TV Show 1 may identify a second plurality of icons for the performance of media guidance application operations (e.g., record, watch, remind, etc.). For example, in response to a user input selecting the record icon, a user device causes the media guidance application to record the corresponding TV Show 1.

It should be noted, the systems and/or methods described above may be applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
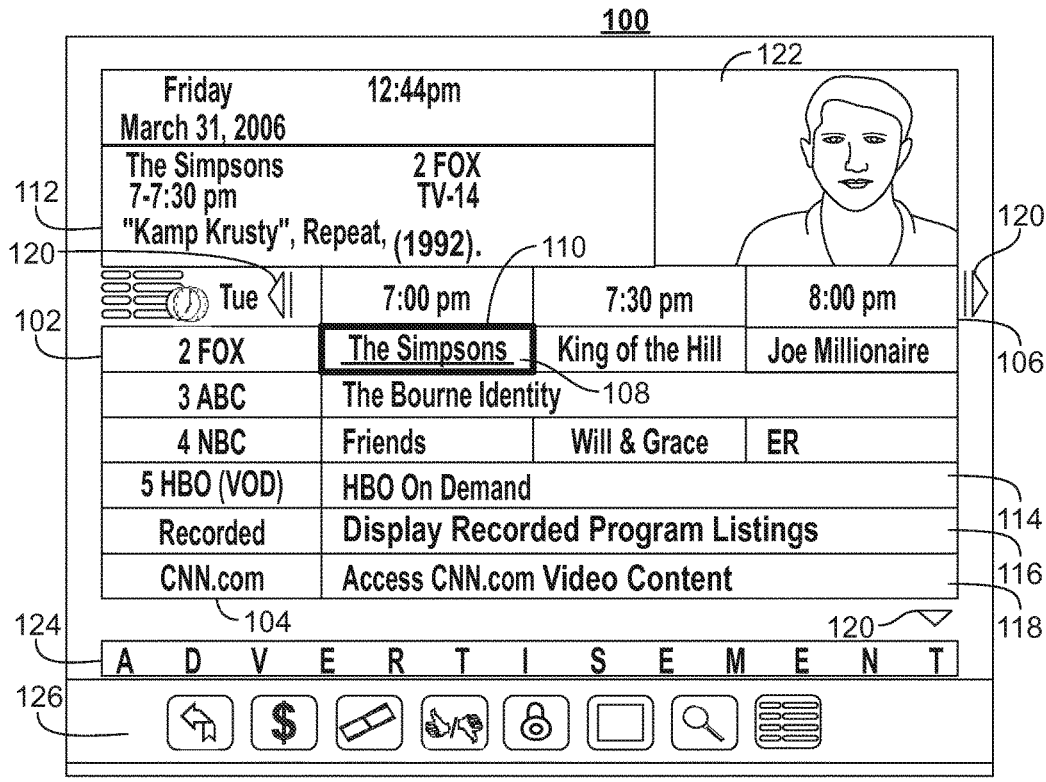
FIG. 1 shows an illustrative example of a media guidance display for navigating and selecting media assets in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
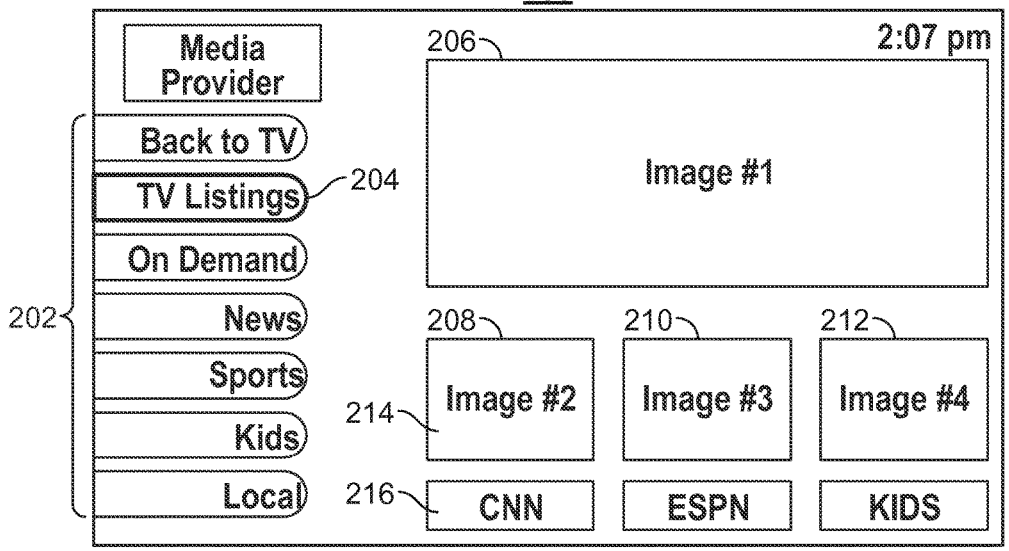
FIG. 2 shows another illustrative example of a media guidance display for navigating and selecting media assets in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

In some embodiments, options region 126 may relate to one or more media guidance application operations. As referred to herein, a "media guidance application operation" refers to any operation corresponding to providing, receiving, and generating media guidance data or content for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device).

Other operations of a media guidance application are to play media assets and provide fast access playback operations for those media assets. As referred to herein, the phrase "fast-access playback operations" should be understood to mean any media guidance application operation that pertains to playing back a non-linear or linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

One of the functions of the media guidance application is to provide media guidance data to users. The providing of media guidance data to users may include generating the media guidance data for display in a navigable menu, such as a scrollable menu. As referred to herein, a "scrollable menu" or a "scrollable display" refers to any type of user interface that reveals or conceals menu options in response to a user input. For example, a scrollable menu may include a list of media guidance data elements that can be scrolled in a linear, circular or any other suitable fashion. In another example, the scrollable menu may be a series of items contained in a graphical user interface that allows the text to be moved up, down, or across a display screen by moving a scrollbar, with new text appearing on the screen as old text disappears. In some embodiments, the scrollable menu may be presented on a dial (as different elements on the outer perimeter of a cylindrical shape). As the dial or cylindrical shape is rotated other items may be revealed as items previously shown on the dial may be removed. In yet another example, a scrollable menu may be a nested menu (i.e., a menu where information is organized in layers or objects contain other similar objects).

Still other operations of media guidance application may include the control of devices used to consume media assets. For example, a media guidance application operation may include turning a device on and off, raising the volume associated with a device, adjusting the display settings of a device, assigning parental controls, transferring information from one device to another, storing and/or recording content, entering authorization information and/or payment information, etc.

In some embodiments, a media guidance application operation may relate to a social media activity such as publicly distributing a notification and/or media assets associated with a user or the video game of the user. For example, the media guidance application may retrieve a list of friends (e.g., a social network buddy list), contacts (e.g., retrieved from a phone/text message/e-mail account associated with the user), and/or other listings featuring other entities with known associations to the user and distribute the notification and/or media assets to contacts. For example, in response to a particular function of a video game being performed (e.g., an in-game character performed particular actions, a particular in-game score or level of progress was achieved, etc.), the media guidance application may post messages to the social network account associated with the user. The message may include a screenshot, recorded segment of a video game, or other media asset that evidences the feat of the user.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations. In some embodiments, the customization may involve setting whether scrolling is enabled for certain icons and sub-menus in scrollable menus.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In some embodiments, the selectable options 202 may be used to select media guidance application operations, such as watching, recording or setting a reminder for a media asset. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
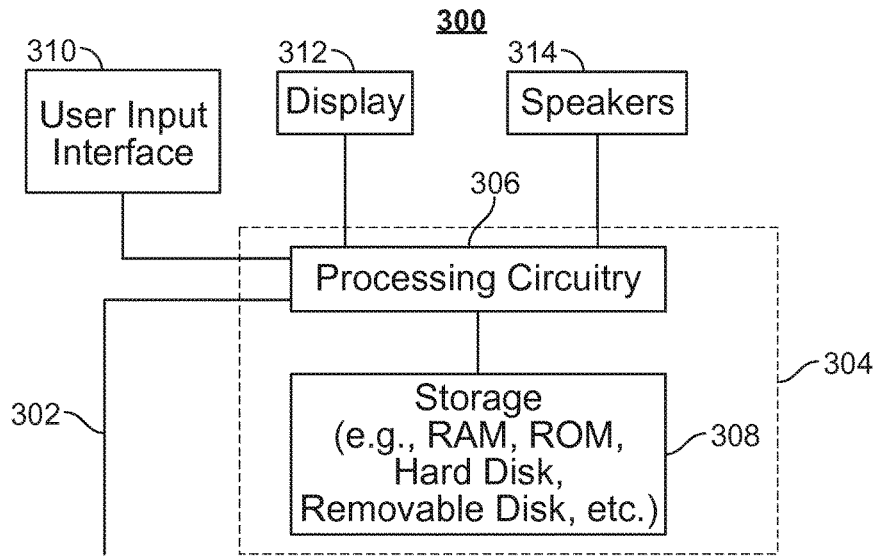
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from user input interface 310. For example, movement of a cursor on a display up/down may be indicated by the processed instructions when user input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on user equipment device 300. This way, the processing of the instructions is performed remotely by the server while the resulting displays are provided locally on user equipment device 300. User equipment device 300 may receive inputs from the user via user input interface 310 and transmit those inputs to the remote server for processing and generating the corresponding displays. For example, user equipment device 300 may transmit a communication to the remote server indicating that an up/down button was selected via user input interface 310. The remote server may process instructions in accordance with that input and generate a display of the application corresponding to the input (e.g., a display that moves a cursor up/down). The generated display is then transmitted to user equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
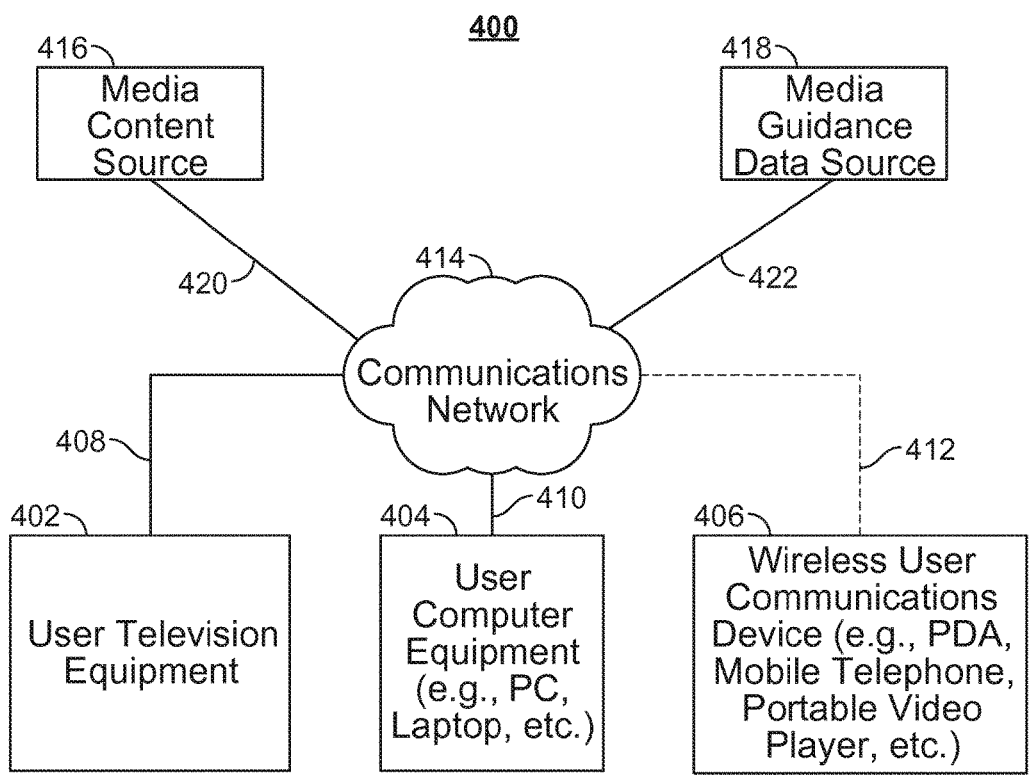
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some user television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406. In some embodiments, wireless user communications devices 406 may include portable devices such as a smartphone or tablet computer, or may include wearable electronics such as smart glasses or other portable computing devices that can be worn as articles of clothing. Depending on the size of a display of the portable device, different user interfaces may be used. For example, as discussed further below in reference to FIG. 5 to FIG. 8, a scrollable interface may be used in devices having small displays.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions that may be stored in storage 308, and executed by control circuitry 304 of a user equipment device 300. In some embodiments, media guidance applications may be client-server applications where only a client application resides on the user equipment device, and a server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
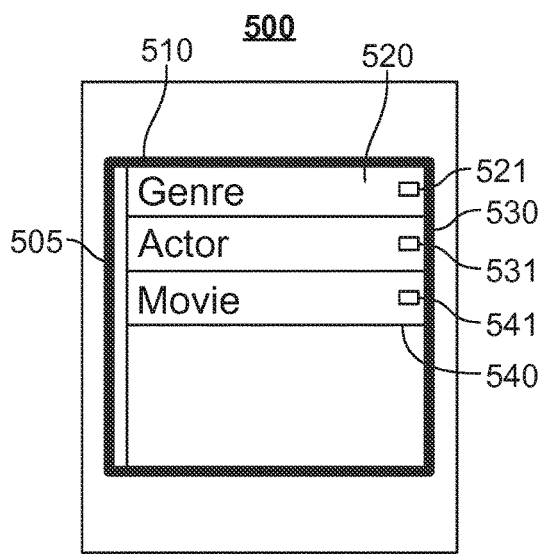
FIG. 5 shows an illustrative scrollable display that includes a plurality of icons in accordance with some embodiments of the disclosure.

FIG. 5 shows an illustrative scrollable display 500 that includes a first plurality of scrollable icons in accordance with some embodiments of the disclosure. In some embodiments, scrollable display 500 may be a nested menu. In such circumstances, each of the first plurality of scrollable icons may be organized in layers such that objects related respective to each of the first plurality of scrollable icons (e.g., sub-menu icons) are revealed as each respective one of the first plurality of scrollable icons is selected. Display 500 may be displayed on a user equipment device, in response to a user selection (e.g., via user input interface 310 (FIG. 3)) of a media guidance application, or any other suitable application implemented on the user equipment device. For example, display 500 (which in some embodiments may correspond to display 312 (FIG. 3)) may be used to provide inputs into a media guidance application to select a media asset. Display 500 may include one or more selectable scrollable icons 520, 530 and 540, each corresponding to an organization criterion for media guidance information, as part of a scrollable menu 510. Although only three scrollable icons are illustrated, it should be understood that any number of scrollable icons may be displayed. Display 500 may include scrollbar 505, which can be used to scroll the plurality of scrollable icons (e.g., 520, 530 and 540) in display 500, for example, if the number of icons to be displayed exceeds the available display area. Control circuitry of a user equipment device may scroll the plurality of scrollable icons as a group in response to a receiving a gesture input from a user. As referred to herein, the term "gesture" should be understood to mean a movement of one or more portions of a user's body part (e.g., finger, hand, face, etc.), across an input device. It should be noted that in some embodiments, a scrollable menu may be scrolled without the use of gestures. For example, the media guidance application may receive a user input (e.g., a keyboard entry, a mouse-click, a "tap" on a touchscreen, etc.) associated with scrolling the scrollable menu (e.g., a user selection of a directional arrow associated with scrolling the scrollable menu in a particular direction). As referred to herein, "scroll as a group" or "scrolling as a group" may refer to the movement of a plurality of icons as a unit. For example, each scrollable icon of the plurality may translate by a same distance. For example, each scrollable icon in the plurality may translate while a distance between each scrollable icon in the plurality remains the same. For example, each scrollable icon in the plurality may be translated about an axis by a same angle or solid angle.

Scrollable icon 520 may correspond to "Genre", scrollable icon 530 may correspond to "Actor" and scrollable icon 540 may correspond to "Movie." Each of these scrollable icons may include an additional operator icon that may be used to remove the corresponding scrollable icon from display, for example, to make the display area available for other information (e.g., other scrollable icons related to other categories or sub-menu icons (discussed below)). Scrollable icon 520 may include operator icon 521, scrollable icon 530 may include operator icon 531 and scrollable icon 540 may include operator icon 541. Each of operator icons 521, 531, and 541 may be selected by pressing a touchscreen where the icon is shown, swiping, navigating a highlight region to the icon or in any other suitable way using input interface 310 (FIG. 3). Selection of operator icon 521 causes control circuitry (e.g., control circuitry 306 (FIG. 3)) of a user equipment device (e.g., user equipment device 402, 404, and/or 406 (FIG. 4)) to remove corresponding scrollable icon 520 from display. Selection of operator icon 531 causes control circuitry of a user equipment device to remove corresponding scrollable icon 530 from display. Selection of operator icon 541 causes control circuitry of a user equipment device to remove corresponding scrollable icon 540 from display. In some implementations, scrollable icons 520, 530, and 540 may be presented in a nested menu such that when a corresponding scrollable icon 520, 530, or 540 is removed, content related to the removed icon may be presented in replacement of the removed icon. In some implementations, when a given one of scrollable icons 520, 530, and 540 is removed, another icon (not shown) that is unrelated to the removed icon may be presented in its place. For example, if scrollable icon 520 is removed by selecting operator icon 521, a new icon that corresponds to "Restaurants" may be presented in its place.

In some embodiments, the media guidance application may scroll scrollable icons 510, 520, and 530 in response to a single user input (e.g., a single gesture). For example, scrollable icons 510, 520, and 530 may be grouped in a single scrollable menu or list.

Figure 6:
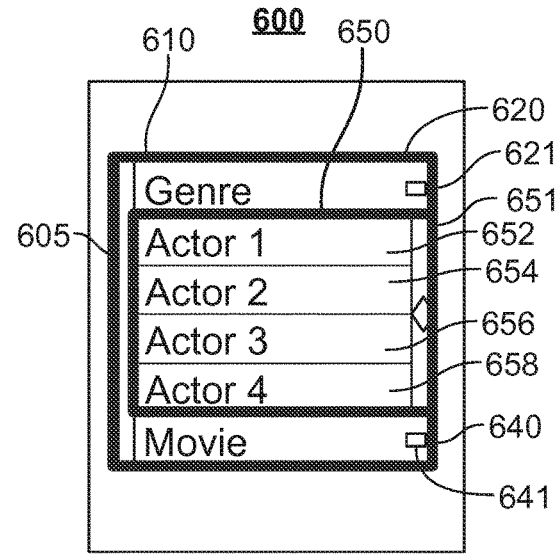
FIG. 6 shows an illustrative scrollable display that includes a plurality of icons and a sub-menu in accordance with some embodiments of the disclosure.

FIG. 6 shows an illustrative scrollable display that includes a plurality of scrollable icons and a sub-menu that includes a plurality of sub-menu icons in accordance with some embodiments of the disclosure. Display 600, which may correspond to display 312 (FIG. 3)) may be displayed in response to a selection (e.g., via user input interface 310 (FIG. 3)) of scrollable icon 530 of FIG. 5. In some embodiments, display 600 may be part of a nested menu that provides information related to an icon selected from display 500. Display 600 includes elements that are similar to those illustrated in FIG. 5. For example, scrollbar 605 is similar to scrollbar 505, scrollable menu 610 is similar to scrollable menu 510, scrollable icon 620 is similar to scrollable icon 520, operator icon 621 is similar to operator icon 521, scrollable icon 640 is similar to scrollable icon 540, and operator icon 641 is similar to icon 541. Display 600 includes a first sub-menu 650 that includes a plurality of sub-menu icons that may be associated with scrollable icon 530. In some embodiments, control circuitry of a user equipment device may replace an associated scrollable icon 530 with the first sub-menu 650, as shown in FIG. 6. In some embodiments, control circuitry of a user equipment device may generate for display the first sub-menu 650 between an associated scrollable icon, and an adjacent scrollable icon, or after an associated scrollable icon if the associated scrollable icon is the at the end of a displayed list. For example, in response to receiving a selection of scrollable icon 530 in FIG. 5, control circuitry of a user equipment device may generate for display a first sub-menu 650 positioned between scrollable icon 530 and scrollable icon 540.

First sub-menu 650 may include one or more sub-menu icons 652, 654, 656, and 658 that may be part of a second plurality of sub-menu icons that are associated with scrollable icon 530. Sub-menu 650 may itself be a nested menu where each sub-menu icon 652, 654, 656 and 658 includes information that is presented in replacement of and that is related to a selected one of sub-menu icons 652, 654, 656 and 658. Each of the second plurality of sub-menu icons may correspond to organization criteria that are a subset of the organization criterion of a selected sub-menu icon. Sub-menu icon 652 may correspond to a category for "Actor 1", sub-menu icon 654 may correspond to a category for "Actor 2", sub-menu icon 656 may correspond to a category for "Actor 3", and sub-menu icon 658 may correspond to a category for "Actor 4". First sub-menu 650 may include a scrollbar 651. Control circuitry of a user equipment device may scroll the sub-menu icons of sub-menu 650 in response to receiving a gesture input indicating scrollbar 651.

In some embodiments, selection of any of the second plurality of sub-menu icons (e.g., 652, 654, and 656) may cause control circuitry of a user equipment device to generate for display information about a media asset related to the selected sub-menu icon of the sub-menu icon and the corresponding selected scrollable icon of the first plurality (e.g., scrollable icon 530 of FIG. 5). In this way, the series of scrollable menus may be used as a filter to successively filter and navigate media guidance information.

In some embodiments, scrolling of scrollable icons 620 and 640, may be disabled. For example, control circuitry of a user equipment device may preclude scrollbar 605 from display in response to receiving the user selection of icon 530 in the display of FIG. 5. Disabling the scrolling of the scrollable icons corresponding to the unselected first plurality of scrollable icons from the display 500 of FIG. 5 may focus the user's attention on the sub-menu icons within sub-menu 750.

Figure 7:
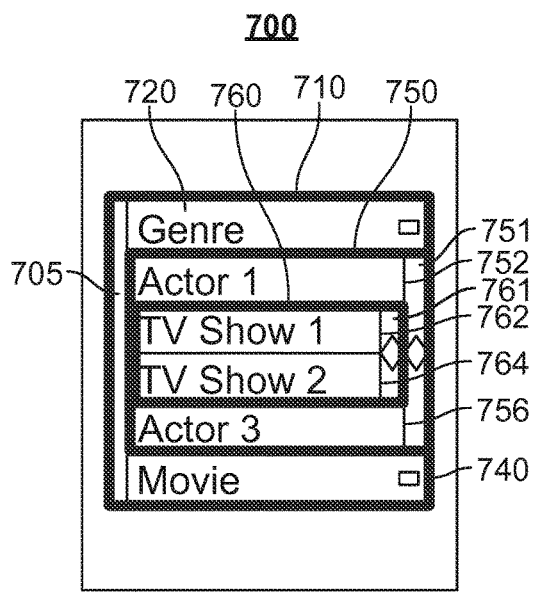
FIG. 7 shows an illustrative scrollable display that includes a plurality of icons and a plurality of sub-menus in accordance with some embodiments of the disclosure.

FIG. 7 shows an illustrative scrollable display that includes a plurality of scrollable icons and a plurality of sub-menus in accordance with some embodiments of the disclosure. Display 700 may be generated for display by control circuitry of a user equipment device in response to a selection of icon 652. Display 700 includes elements that are similar to those illustrated in FIG. 5 and FIG. 6 and may be a nested menu. For example, scrollbar 705 is similar to scrollbar 605 and scrollbar 505, scrollable menu 710 is similar to scrollable menu 510 and 610, scrollable icon 720 is similar to icon 520 and icon 620, operator icon 721 is similar to operator icon 521 and 621, scrollable icon 740 is similar to icon 540 and icon 640, operator icon 741 is similar to icon 541 and 641, sub-menu icon 752 is similar to icon 652, sub-menu icon 756 is similar to icon 656, scrollbar 751 is similar to scrollbar 651. Sub-menu 750 is similar to sub-menu 650, except that sub-menu 750 further includes second sub-menu 760. Second sub-menu 760 may include a scrollbar 761. In some embodiments, control circuitry of a user equipment device may replace an associated sub-menu icon 654 with second sub-menu 760, as shown in FIG. 7. In some embodiments, control circuitry of a user equipment device may generate for display the second sub-menu 760 between an associated sub-menu icon and an adjacent sub-menu icon, or after an associated sub-menu icon if the associated icon is the at the end of a displayed list. For example, in response to receiving a section of sub-menu icon 654 in FIG. 6, control circuitry of a user equipment device may generate for display a second sub-menu 760 positioned between sub-menu icons 654 and 656.

Second sub-menu 760 may include one or more sub-menu icons 762 and 764 that may be part of a third plurality of sub-menu icons that are associated with icon 654. Each of the third plurality of sub-menu icons may correspond to organization criteria that are a subset of the organization criterion of a selected sub-menu icon. In some embodiments, each of the third plurality of sub-menu icons may correspond to a media asset that corresponds to Actor 2 of selected sub-menu icon 654, and the Actor criterion of selected icon 530. For example, sub-menu icon 762 may correspond to "TV Show 1" and sub-menu icon 764 may correspond to "TV Show 2." Second sub-menu 750 may include a scrollbar 752. Control circuitry of a user equipment device may scroll the sub-menu icons of sub-menu 750 in response to receiving a gesture input indicating scrollbar 751.

Figure 8:
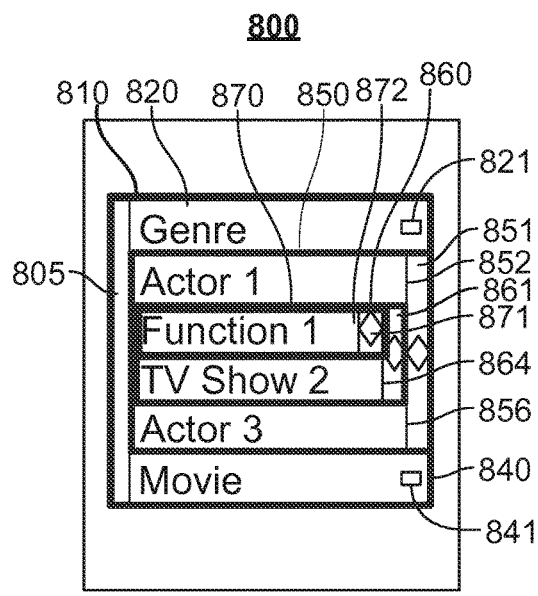
FIG. 8 shows an illustrative scrollable display that includes a plurality of icons, a plurality of sub-menus, and a menu for selecting a media guidance application operation in accordance with some embodiments of the disclosure.

FIG. 8 shows an illustrative scrollable display that includes a plurality of scrollable icons, a plurality of sub-menus, and a menu for selecting a media guidance application operation in accordance with some embodiments of the disclosure. Display 800 may be generated for display by control circuitry of a user equipment device in response to a selection of icon 762 of FIG. 7. Display 800 includes elements that are similar to those illustrated in FIG. 5, FIG. 6 and FIG. 7 and may be a nested menu. For example, scrollbar 805 is similar to scrollbars 505, 605 and 705, scrollable menu 810 is similar to scrollable menu 510, 610 and 710, scrollable icon 820 is similar to scrollable icons 520, 620 and 720, operator icon 821 is similar to operator icons 521, 621 and 721, scrollable icon 840 is similar to icons 540, 640 and 740, operator icon 841 is similar to icons 541, 641, and 741, icon 852 is similar to sub-menu icons 652 and 752, sub-menu icon 856 is similar to icons 656 and 756, sub-menu icon 864 is similar to sub-menu icon 764, scrollbar 851 is similar to scrollbars 651 and 751, scrollbar 861 is similar to scrollbar 761. Sub-menu 850 is similar to sub-menus 750 and 650, and sub-menu 860 is similar to sub-menu 760 except that sub-menus 850 and 860 further include third sub-menu 870. Third sub-menu 870 may include a scrollbar 871. In some embodiments, control circuitry of a user equipment device may replace an associated sub-menu icon 762 with third sub-menu 870, as shown in FIG. 8. In some embodiments, control circuitry of a user equipment device may generate for display the third sub-menu 870 between an associated icon and an adjacent icon, or after an associated sub-menu icon if the associated sub-menu icon is the at the end of a displayed list. For example, in response to receiving a section of sub-menu icon 762 in FIG. 7, control circuitry of a user equipment device may generate for display a third sub-menu 870 positioned after or between sub-menu icons 762 and 764.

Third sub-menu 870 may include one or more sub-menu icons 872 that may be part of a fourth plurality of sub-menu icons that are associated with sub-menu icon 762. In some embodiments, each of the fourth plurality of sub-menu icons may correspond to a media guidance application operation. For example, icon 872 may correspond to "FUNCTION 1", which may be a record operation or any other suitable media guidance application operation. In some embodiments, each of the fourth plurality of sub-menu icons may correspond to organization criteria that are a subset of the organization criterion of a selected sub-menu icon (e.g., icon 762 of FIG. 7, icon 654 of FIG. 6 and icon 530 of FIG. 5).

In some embodiments, scrollbar 505 discussed in connection with FIGS. 5-8 may be omitted. In such circumstances, the items (e.g., scrollable icons and/or sub-menu icons) may be presented on respective dials. For example, scrollable icons 520, 530 and 540 may be presented as separate horizontal elements along different regions of an outer perimeter of a cylindrical shape. As the cylinder or dial is rotated, icons 520, 530 and 540 may be rotated around the cylinder to reveal other icons while removing icons 520, 530 and 540 from the display one at a time as the cylinder or dial continues to rotate. In some embodiments, multiple dials may be used. For example, a first dial may include a plurality of scrollable icons while a second dial may be presented within the first dial (as shown in FIG. 6) and may include a plurality of sub-menu icons related to one of the scrollable icons of the first dial. The second dial may also be rotated to reveal other sub-menu icons one at a time as the second dial is rotated within the first dial. As the second dial is rotated, the first dial may remain stationary.

For example, when the first and second dials are presented, the user choose which of the first and second dials to rotate (e.g., to reveal other items) based on a position where the rotation start. In particular, if the user starts the rotation by pressing on a scrollable icon of the first dial and swiping downwards or upwards, the first dial may rotate while the second dial remains stationary. If the user starts the rotation by pressing on a sub-menu icon of the second dial and swiping downwards or upwards, the second dial may rotate while the first dial remains stationary.

It should be noted that while FIG. 5 to FIG. 8 are described in the context of a display with four successive menus, embodiments of the present disclosure are not limited to only four successive menus but may be any number of menus. In some embodiments, there are two successive menus. For example, a first menu may be illustrated in FIG. 5. A second menu may be similar to display 600 illustrated in FIG. 6, with sub-menu 650 replaced by sub-menu 860, including a plurality of sub-menu icons corresponding to media guidance application operations. In some embodiments, each time a successive scrollable menu is nested into a prior menu, the media guidance application determines a new area of the display screen is that is associated with scrolling a particular plurality of icons.

Figure 9:
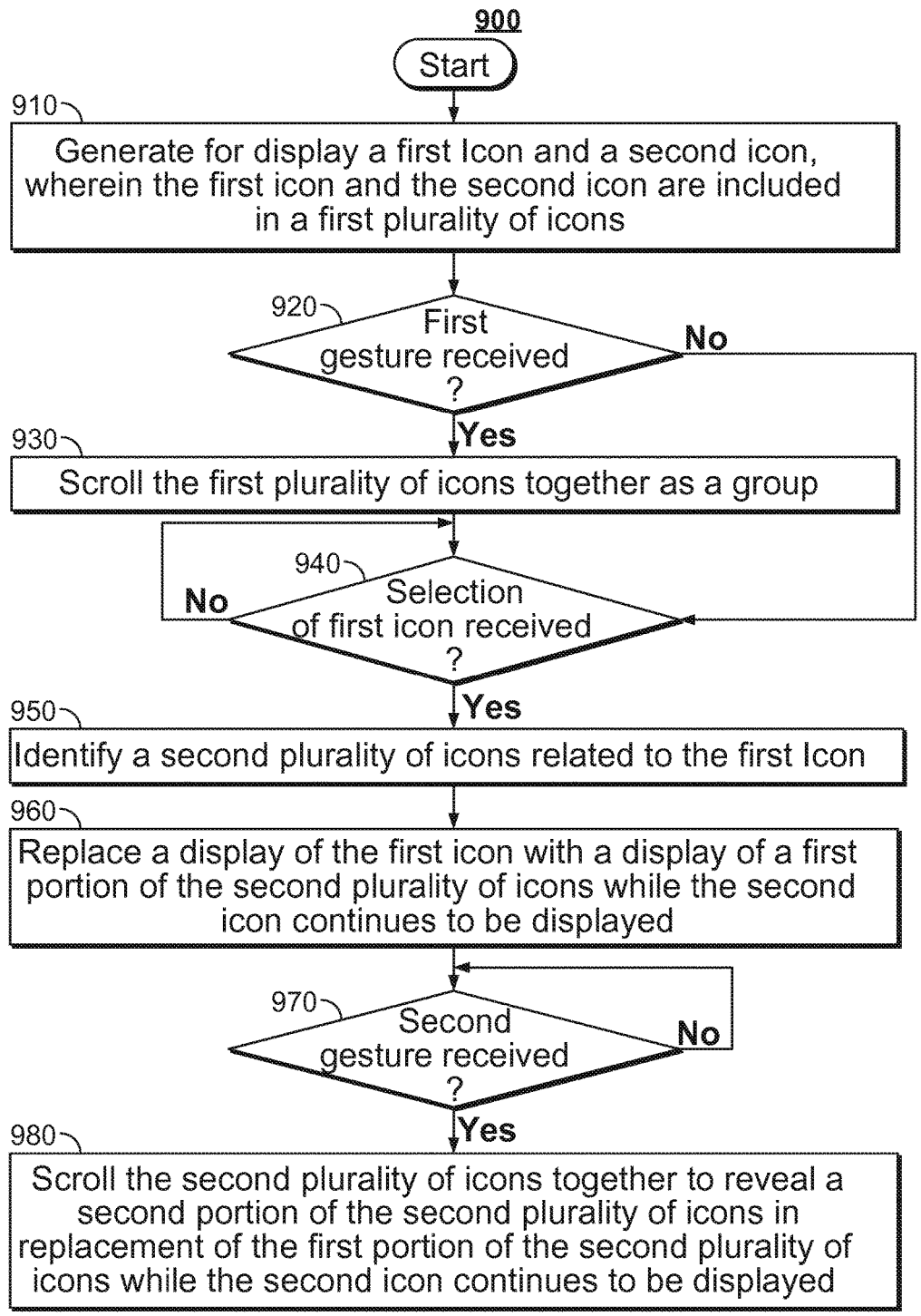
FIG. 9 is a flow chart of illustrative steps for generating for display a scrollable menu in accordance with some embodiments of the disclosure.

FIG. 9 is a flow chart of illustrative steps for generating for display a scrollable menu in accordance with some embodiments of the disclosure. It should be noted that process 900 or any step thereof could be performed on, or provided by, any of the devices shown in FIGS. 3-4. For example, process 900 may be executed by control circuitry 304 (FIG. 3) as instructed by a media guidance application implemented on a user device (e.g., user equipment devices 402, 404, and/or 406 (FIG. 4)) in order to determine a media guidance application operation to perform. In addition, one or more steps of process 900 may be incorporated into or combined with one or more steps of any other process or embodiment (e.g., process 1000 (FIG. 10)).

At step 910, the media guidance application generates for display (e.g., via control circuitry 304 (FIG. 3)) a first icon (e.g., scrollable icon 530 (FIG. 5)) and a second icon (e.g., scrollable icon 540 (FIG. 5)) on a display device (e.g., user equipment device 402, 404, and/or 406 (FIG. 4)) where the first icon and the second icon are included in a first plurality of icons (e.g., scrollable icons 520, 530 and 540 (FIG. 5)). For example, the media guidance application may generate for display a menu (e.g., a nested menu) on a smartphone, personal computer, etc. connected to a network (e.g., a home network). It should be noted that while the above generating of icons has been described in reference to FIG. 5, process 900 of FIG. 9 may apply to any of FIG. 5 to FIG. 8 or any combination thereof. In some embodiments, the first icon may be sub-menu icon 652 of FIG. 6 and the second icon may be sub-menu icon 654 of FIG. 6. In some embodiments, the first icon may be sub-menu icon 752 of FIG. 7 and the second icon may be sub-menu icon 754 of FIG. 7.

At step 920, the media guidance application determines (e.g., via control circuitry 304 (FIG. 3)) whether a first gesture has been received. For example, the media guidance application may determine whether a gesture has been received (e.g., via user input interface 310 (FIG. 3)) on an input device (e.g., a touchscreen or touchpad of a user computer equipment 404 and/or wireless user communications device 406 (FIG. 4)). If the media guidance application determines (e.g., via control circuitry 304 (FIG. 3)) that a first gesture has been received, the media guidance application proceeds to step 930. If the media guidance application determines (e.g., via control circuitry 304 (FIG. 3)) that a first gesture has not been received, the media guidance application proceeds to step 940.

In some embodiments, the first icon and second icon are generated for display on a display device (e.g., display 312 of FIG. 3) such as a monitor or a user equipment device (e.g., user computer equipment 404 and/or wireless user communications device 406) such as a Smart-Glass while the user input is received on a device that is separate from the display device or the user equipment device that generates the information for display. For example, the display device may be a Smart-Glass while the user input device may be a touchpad. In some embodiments, the first icon and the second are generated for display on a user equipment device that is the same as the user equipment device used to receive inputs from a user.

At step 930, the media guidance application scrolls (e.g., via control circuitry 304 (FIG. 3)) the first plurality of icons (e.g., scrollable icons 520, 530, 540 (FIG. 5)) as a group. For example, the media guidance application may direct a display device (e.g., of a user television equipment 402, user computer equipment 404 and/or wireless user communications device (FIG. 4)) to scroll the first plurality of icons such that an icon at either the bottom or the top of the display is replaced by another icon.

At step 940, the media guidance application determines (e.g., via control circuitry 304 (FIG. 3)) whether a selection of the first icon (e.g., scrollable icon 530 (FIG. 5)) has been received. For example, the media guidance application may determine whether a selection of the first icon has been received (e.g., via user input interface 310 (FIG. 3)) on an input device (e.g., a touchscreen or touchpad of a user computer equipment 404 and/or wireless user communications device 406 (FIG. 4)). If the media guidance application determines (e.g., via control circuitry 304 (FIG. 3)) that a selection of the first icon has been received, the media guidance application proceeds to step 950. Otherwise, the media guidance application polls on step 940.

At step 950, the media guidance application identifies (e.g., via control circuitry 304 (FIG. 3)) a second plurality of icons (e.g., sub-menu icons 652, 654, 656, 658 (FIG. 6)) related to the first icon (e.g., icon 530 (FIG. 5)). The first icon may be presented in a nested menu and may be related to the second plurality of icons that are in a deeper layer of the nested menu revealed when the first icon is selected. In some embodiments, the media guidance application may cross-reference (e.g., via control circuitry 304 (FIG. 3)) a database (e.g., stored in storage 308 (FIG. 3)) stored on a user equipment device to identify the second plurality of icons that are related to the first icon. In some embodiments, the media guidance application may identify the second plurality of icons by sending a request (e.g., via control circuitry 304 (FIG. 3)) to a media guidance data source (e.g., media guidance data source 418 (FIG. 4)) across a network (e.g., via I/O path 302 (FIG. 3) and/or any of paths 408, 410, 412 and/or 422 (FIG. 4)).

At step 960, the media guidance application replaces (e.g., via control circuitry 304 (FIG. 3)) a display (e.g., displayed on display 312 (FIG. 3)) of the first icon (e.g., scrollable icon 530 (FIG. 5)) with a display of a first portion (e.g., sub-menu icons 652, 654, 656, 658 (FIG. 6)) of the second plurality of icons while the second icon (e.g., scrollable icon 540 (FIG. 5), scrollable icon 640 (FIG. 6)) continues to be displayed. In some embodiments the media guidance application may insert the first portion of the second plurality of icons between the first icon (e.g., scrollable icon 530 (FIG. 5)) and the second icon (e.g., scrollable icon 540 (FIG. 5)) instead of replacing the display of the first icon.

At step 970, the media guidance application determines (e.g., via control circuitry 304 (FIG. 3)) whether a second gesture has been received. For example, the media guidance application may determine whether a gesture has been received (e.g., via user input interface 310 (FIG. 3)) on an input device (e.g., a touchscreen or touchpad of a user computer equipment 404 and/or wireless user communications device 406 (FIG. 4)). If the media guidance application determines (e.g., via control circuitry 304 (FIG. 3)) that a second gesture has been received, the media guidance application proceeds to step 980. If the media guidance application determines (e.g., via control circuitry 304 (FIG. 3)) that a first gestures has not been received, the media guidance application polls on step 970.

At step 980, the media guidance application scrolls (e.g., via control circuitry 304 (FIG. 3)) the second plurality of icons (e.g., sub-menu icons 652, 654, 656, 658 (FIG. 5)) together as a group to reveal a second portion of the second plurality of icons in replacement of the first portion of the second plurality of icons while the second icon (e.g., sub-menu icon 641 (FIG. 6)) continues to be displayed. For example, the media guidance application may direct a display device (e.g., of a user television equipment 402, user computer equipment 404 and/or wireless user communications device (FIG. 4)) to scroll the second plurality of icons such that an icon (e.g., sub-menu icon 652 (FIG. 6)) at the top of the sub-menu is removed from display and replaced by an icon at the bottom of the sub-menu.

In some embodiments, the second icon remains stationary as the second plurality of icons are scrolled. For example, in reference to display 600 of FIG. 6, a user equipment device may not scroll scrollable icon 640, while the user equipment device may scroll scrollable icon 620. For example, in reference to display 600 of FIG. 6, a user equipment device may not scroll icon scrollable 640 or scrollable icon 620.

In some embodiments, control circuitry of a user equipment device may adjust a size of each of the second plurality of icons related to the first icon when the second plurality of icons is scrolled. For example in reference to FIG. 6, control circuitry of the user equipment device may reduce the size of each of the icons in sub-menu 650 so that more icons may be displayed during the scrolling operation. For example, in reference to FIG. 6, control circuitry of the user equipment device may increase the size of each of the icons in the sub-menu 650 so that the content of the icons may be seen more clearly during the scrolling operation. It should be noted that the adjustment of the size of the second plurality of icons applies equally to the menu 710 and sub-menus 750 and 760 of FIG. 7, and to the menu 810 and sub-menus 850, 860 and 870 of FIG. 8.

In some embodiments, the first plurality of icons are no longer scrolled together after receiving the selection of the first icon. For example, the user equipment device may remove scrollbar 605 from display 600 of FIG. 6 to restrict scrolling to sub-menu 650. The user equipment device may remove scrollbars 705 and 751 from display 700 of FIG. 7 to restrict scrolling to sub-menu 760. The user equipment device may remove scrollbars 805, 851, and 861 from display 800 of FIG. 8 to restrict scrolling to sub-menu 870 of FIG. 8. It should be understood that any number or combinations of the scrollbars in FIG. 6 to FIG. 8 may be disabled or enabled in various embodiments of the disclosure.

It is contemplated that the steps or descriptions of FIG. 9 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Each of the steps may be performed in context of any of FIGS. 5-8. Furthermore, it should be noted that any of the devices or equipment discussed in relation to FIGS. 3-4 could be used to perform one or more of the steps in FIG. 9.

Figure 10:
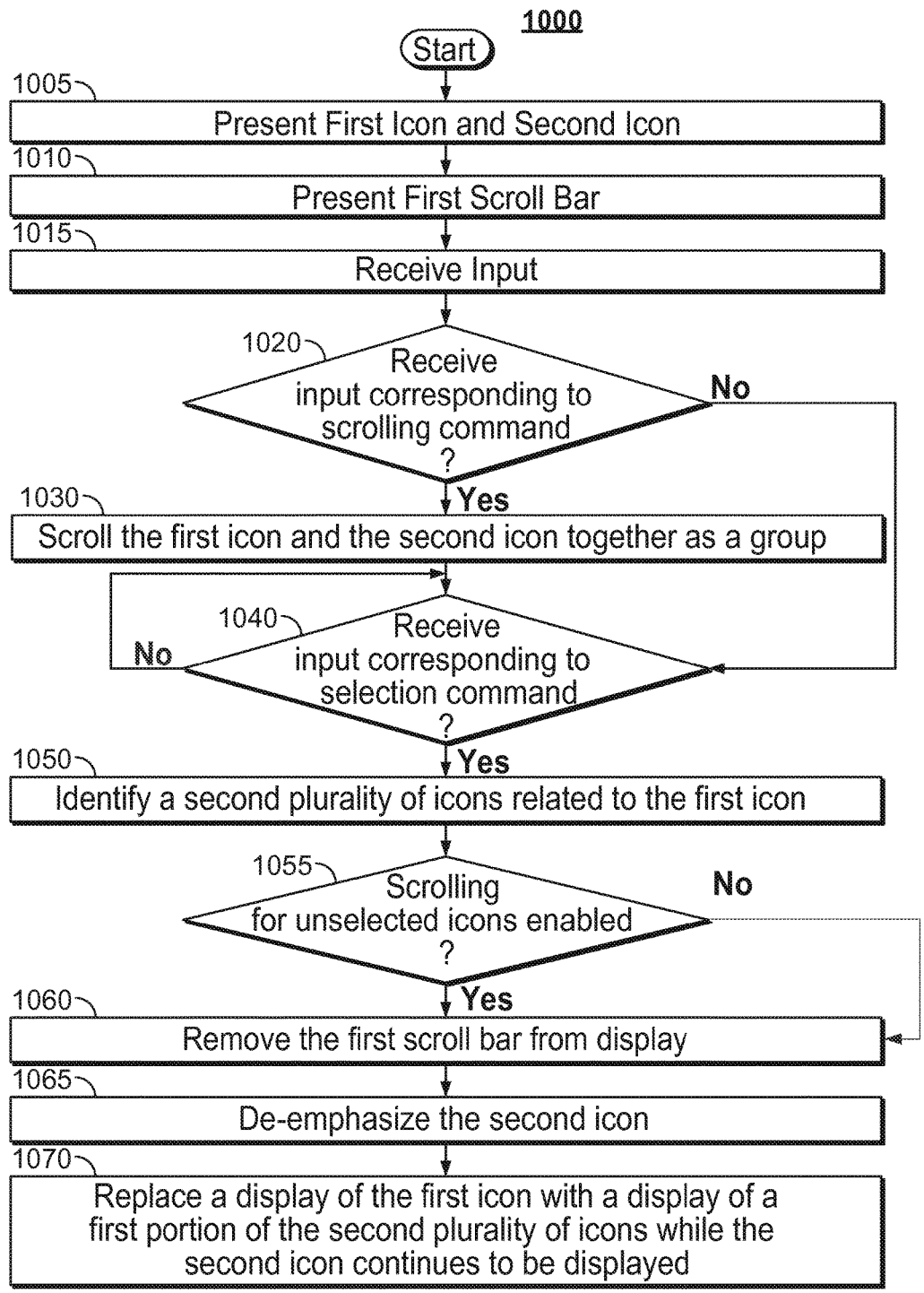
FIG. 10 is a flow chart of illustrative steps for presenting a scrollable menu with an option for whether to scroll unselected icons, in accordance with some embodiments of the disclosure.

FIG. 10 is a flow chart of illustrative steps for presenting a scrollable menu with an option for whether to scroll unselected icons, in accordance with some embodiments of the disclosure. It should be noted that process 800 or any step thereof could be performed on, or provided by, any of the devices shown in FIGS. 3-4. For example, process 1000 may be executed by control circuitry 304 (FIG. 3) as instructed by a media guidance application implemented on a user device (e.g., user equipment devices 402, 404, and/or 406 (FIG. 4)) in order to determine a media guidance application operation to perform. In addition, one or more steps of process 800 may be incorporated into or combined with one or more steps of any other process or embodiment (e.g., process 900 (FIG. 9)).

At step 1005, the media guidance application presents (e.g., via control circuitry 304 (FIG. 3)) a first icon (e.g., scrollable icon 530 (FIG. 5)) and a second icon (e.g., scrollable icon 540 (FIG. 5)) on a display device (e.g., user equipment device 402, 404, and/or 406 (FIG. 4)). For example, the media guidance application may generate for display a menu on a smartphone, personal computer, etc., connected to a network (e.g., a home network).

At step 1010, the media guidance application presents (e.g., via control circuitry 304 (FIG. 3)) a first scrollbar (e.g., scrollbar 505 (FIG. 5)) on a display device (e.g., user equipment device 402, 404, and/or 406 (FIG. 4)). For example, the media guidance application may generate for display a scrollbar next to a plurality of icons on a smartphone, personal computer, etc. connected to a network (e.g., a home network).

In some embodiments, the media guidance application may indicate whether the plurality of icons in a menu or sub-menu are scrollable, by, for example, generating for display, precluding from display or removing from display a scrollbar next to a corresponding plurality of icons in a menu or sub-menu.

At step 1015, the media guidance application receives (e.g., via user input interface 310 (FIG. 3)) a user input (e.g., a gesture, selection of an icon on a screen or any other suitable user input). For example, the media guidance application may receive a gesture input via a touchscreen of a wireless user communications device.

At step 1020, the media guidance application determines (e.g., via control circuitry 304 (FIG. 3)) whether it has received input corresponding to a scrolling command. If the media guidance application determines (e.g., via control circuitry 304 (FIG. 3)) that it has received input corresponding to a scrolling command, the media guidance application proceeds to step 1030. If the media guidance application determines (e.g., via control circuitry 304 (FIG. 3)) that it has not received input corresponding to a scrolling command, the media guidance application proceeds to step 1040.

At step 1030, the media guidance application determines (e.g., via control circuitry 304 (FIG. 3)) whether it has received input corresponding to a selection command. If the media guidance application determines (e.g., via control circuitry 304 (FIG. 3)) that it has received input corresponding to a selection command, the media guidance application proceeds to step 1050. If the media guidance application determines (e.g., via control circuitry 304 (FIG. 3)) that it has not received input corresponding to a scrolling command, the media guidance application proceeds to step 1040.

In some embodiments, the first plurality of icons are no longer scrolled together after receiving a selection of the first icon. For example, control circuitry of a user equipment device may preclude from display or remove from display a scrollbar 605 in reference to display 600 FIG. 6, when icon 530 is selected from display 500 of FIG. 5. For example, in reference to FIG. 6, control circuitry of a user equipment device may split scrollbar 605 into two smaller control bars, a first control bar corresponding to a first scrollable region including icon 620 and a second control bar corresponding to a second scrollable region including icon 640. In this way, a user may still navigate sub-menu 650 while navigating information for the first plurality of icons in the first scrollable region including icon 620 and the second scrollable region including icon 640.

At step 1050, the media guidance application identifies (e.g., via control circuitry 304 (FIG. 3)) a second plurality of icons (e.g., sub-menu icons 652, 654, 656, 658 (FIG. 6)) related to the first icon (e.g., scrollable icon 530 (FIG. 5)). In some embodiments, the media guidance application may cross-reference (e.g., via control circuitry 304 (FIG. 3)) a database (e.g., stored in storage 308 (FIG. 3)) stored on a user equipment device to identify a second plurality of icons that are related to the first icon. In some embodiments, the media guidance application may identify the second plurality of icons by sending a request (e.g., via control circuitry 304 (FIG. 3)) to a media guidance data source (e.g., media guidance data source 418 (FIG. 4)) across a network (e.g., via I/O path 302 (FIG. 3) and/or any of paths 408, 410, 412 and/or 422 (FIG. 4)).

At step 1055, the media guidance application determines (e.g., via control circuitry 304 (FIG. 3)) whether scrolling for unselected icons is enabled. If the media guidance application determines (e.g., via control circuitry 304 (FIG. 3)) that scrolling for unselected icons is enabled, the media guidance application proceeds to step 1060. If the media guidance application determines (e.g., via control circuitry 304 (FIG. 3)) that scrolling for unselected icons has not been enabled, the media guidance application proceeds to step 1070.

At step 1060, the media guidance application removes (e.g., via control circuitry 304 (FIG. 3)) the first scrollbar (e.g., scrollbar 605 (FIG. 6)) on a display device (e.g., user equipment device 402, 404, and/or 406 (FIG. 4)). For example, the media guidance application may remove from display a scrollbar next to a plurality of icons on a smartphone, personal computer, etc. connected to a network (e.g., a home network).

At step 1065, the media guidance application de-emphasizes (e.g., via control circuitry 304 (FIG. 3)) the second icon (e.g., icon 641 (FIG. 6)) on a display device (e.g., user equipment device 402, 404, and/or 406 (FIG. 4)). For example, the media guidance application may de-emphasize the second icon by reducing the size or increasing the transparency of the second icon in the display. De-emphasis of the second icon helps focus a user's attention onto a sub-menu (e.g., sub-menu 650 (FIG. 6)) to be displayed.

At step 1070, the media guidance application replaces (e.g., via control circuitry 304 (FIG. 3)) a display of the first icon (e.g., scrollable icon 530 (FIG. 5)) with a display of a first portion of the second plurality of icons (e.g., sub-menu icons 652, 654, 656, 658 (FIG. 6)) while the second icon continues to be displayed. In some embodiments the media guidance application may insert the first portion of the second plurality of icons between the first icon (e.g., scrollable icon 530 (FIG. 5)) and the second icon (e.g., icon 540 (FIG. 5)) instead of replacing the display of the first icon.

In some embodiments, second icon remain remains stationary as the second plurality of icons are scrolled. For example, in reference to FIG. 6, control circuitry of a user equipment device may prevent icon 640 from scrolling, as the plurality of icons in sub-menu 650 are scrolled.

In some embodiments, control circuitry of a user equipment device may adjust a size of each of the second plurality of icons related to the first icon when the second plurality of icons is scrolled. For example, in reference to FIG. 6, control circuitry of the user equipment device may reduce the size of each of the icons in sub-menu 650 so that more icons may be displayed during the scrolling operation. For example, in reference to FIG. 6, control circuitry of the user equipment device may increase the size of each of the icons in the sub-menu 650 so that the content of the icons may be seen more clearly during the scrolling operation. It should be noted that the adjustment of the size of the second plurality of icons applies equally to the menu 710 and sub-menus 750 and 760 of FIG. 7, and to the menu 810 and sub-menus 850, 860 and 870 of FIG. 8.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Each of the steps may be performed in context of any of FIGS. 5-8. Furthermore, it should be noted that any of the devices or equipment discussed in relation to FIGS. 3-4 could be used to perform one or more of the steps in FIG. 10.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flow charts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of navigating media content, the method comprising:
    generating for display, using control circuitry, a first icon and a second icon, wherein the first icon and the second icon are included in a first plurality of icons that are scrolled together in response to a first gesture;
    receiving, using the control circuitry, a selection of the first icon;
    in response to receiving the selection of the first icon, identifying, using the control circuitry, a second plurality of icons related to the first icon;
    replacing a display, using the control circuitry, of the first icon with a display of a first portion of the second plurality of icons while the second icon continues to be displayed;
    in response to a second gesture comprising pressing on one of the second plurality of icons and swiping in a given direction, scrolling, using the control circuitry, the second plurality of icons together to reveal a second portion of the second plurality of icons in replacement of the first portion of the second plurality of icons while the second icon continues to be displayed;
    reducing a size of each of the second plurality of icons related to the first icon when the second plurality of icons is scrolled; and
    in response to a third gesture comprising pressing on one of the first plurality of icons and swiping in the given direction, scrolling, using the control circuitry, the first plurality of icons while at least one of the second plurality of icons is displayed, wherein the third gesture causes the second icon to be replaced by a third icon of the first plurality of icons, wherein the second plurality of icons are scrolled in the same given direction as the first plurality of icons.

2. The method of claim 1, wherein the second icon remains stationary as the second plurality of icons are scrolled.

3. The method of claim 1, wherein a gesture comprises a movement of one or more digits across an input device.

4. The method of claim 1, wherein the first plurality of icons are no longer scrolled together after receiving the selection of the first icon.

5. The method of claim 1, wherein the first icon and the second icon are generated for display on a first device in response to a user input on a second device.

6. The method of claim 1, comprising:
    de-emphasizing the second icon when the first icon is selected.

7. The method of claim 1, comprising:
    indicating that the second plurality of icons is scrollable.

8. The method of claim 1, wherein replacing the display of the first icon with the display of the first portion of the second plurality of icons while the second icon continues to be displayed further comprises nesting the first portion of the second plurality of icons in a cell previously occupied by the first icon.

9. The method of claim 1, wherein each of the second plurality of icons related to the first icon corresponds to a media guidance application operation.

10. A system for navigating media content, the system comprising:
    storage circuitry configured to store instructions for processing a user input; and
    control circuitry configured to:
        generate for display a first icon and a second icon, wherein the first icon and the second icon are included in a first plurality of icons that are scrolled together in response to a first gesture;
        receive a selection of the first icon;
        in response to receiving the selection of the first icon, identify a second plurality of icons related to the first icon;
        replace a display of the first icon with a display of a first portion of the second plurality of icons while the second icon continues to be displayed;
        in response to a second gesture comprising pressing on one of the second plurality of icons and swiping in a given direction, scroll the second plurality of icons together to reveal a second portion of the second plurality of icons in replacement of the first portion of the second plurality of icons while the second icon continues to be displayed;
        reduce a size of each of the second plurality of icons related to the first icon when the second plurality of icons is scrolled; and
        in response to a third gesture comprising pressing on one of the first plurality of icons and swiping in the given direction, scrolling the first plurality of icons while at least one of the second plurality of icons is displayed, wherein the third gesture causes the second icon to be replaced by a third icon of the first plurality of icons, wherein the second plurality of icons are scrolled in the same given direction as the first plurality of icons.

11. The system of claim 10, wherein the second icon remains stationary as the second plurality of icons are scrolled.

12. The system of claim 10, wherein a gesture comprises a movement of one or more digits across an input device.

13. The system of claim 10, wherein the first plurality of icons are no longer scrolled together after receiving the selection of the first icon.

14. The system of claim 10, wherein the first icon and the second icon are generated for display on a first device in response to a user input on a second device.

15. The system of claim 10, wherein the control circuitry is further configured to:
    de-emphasize the second icon when the first icon is selected.

16. The system of claim 10, wherein the control circuitry is further configured to:
    indicate that the second plurality of icons is scrollable.

17. The system of claim 10, wherein the control circuitry is further configured to replace the display of the first icon with the display of the first portion of the second plurality of icons while the second icon continues to be displayed by nesting the first portion of the second plurality of icons in a cell previously occupied by the first icon.

18. The system of claim 10, wherein each of the second plurality of icons related to the first icon corresponds to a media guidance application operation.

\* \* \* \* \*